United States Patent [19]

Ohara et al.

[11] 3,903,022
[45] Sept. 2, 1975

[54] SUBLIMABLE FRAGRANCE COMPOSITION

[75] Inventors: Mitsuo Ohara, Yokohama; Hideki Yoshigi, Machida, both of Japan

[73] Assignee: Takasago Perfumery Co., Ltd., Tokyo, Japan

[22] Filed: July 10, 1974

[21] Appl. No.: 487,090

[30] Foreign Application Priority Data
July 10, 1973   Japan.................................. 48-77046

[52] U.S. Cl............................. 252/522; 260/666 M
[51] Int. Cl............................................... C11b 9/00
[58] Field of Search................. 252/522; 260/666 M

[56] References Cited
UNITED STATES PATENTS

| | | | |
|---|---|---|---|
| 2,300,769 | 11/1942 | Berry................................. | 252/522 |
| 3,437,701 | 4/1969 | Capaldi.......................... | 260/666 M |
| 3,457,318 | 7/1969 | Capaldi.......................... | 260/666 M |

Primary Examiner—Veronica O'Keefe
Attorney, Agent, or Firm—Sughrue, Rothwell, Mion, Zinn and Macpeak

[57] ABSTRACT

A sublimable fragrance composition containing adamantane and perfume. The composition, when molded, neither softens nor deforms subliming at a rate just corresponding to that of the perfume. Also, the adamantane is nearly odorless and does not change the character of the odor of the perfume.

4 Claims, 1 Drawing Figure

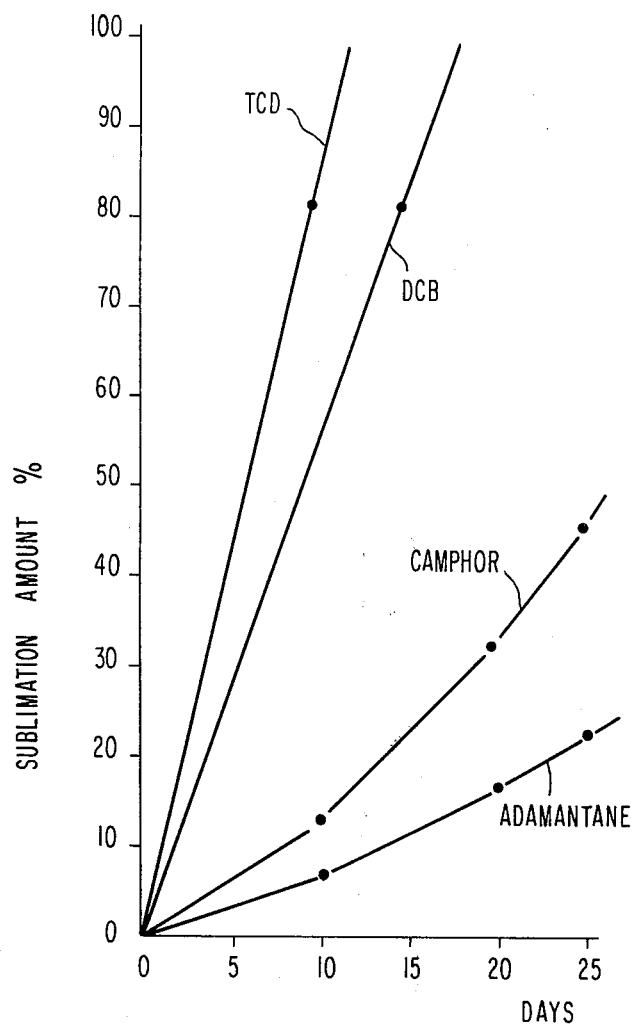

3,903,022

SUBLIMABLE FRAGRANCE COMPOSITION

BACKGROUND OF THE INVENTION

1. Field of the Invention

This invention relates to a sublimable fragrance composition and, specifically, to a sublimable fragrance composition containing adamantane and perfume.

2. Description of the Prior Art

Sublimable fragrance compositions which are commercially available or are known in the patent art usually contain as sublimable substances p-dichlorobenzene (referred to as DCB hereinafter), camphor, tricyclo[5.2.1.0$^{2,6}$]decane (referred to as TCD hereinafter), etc. These sublimable substances are widely used as room deodorants and air-freshners, either subjected to compression molding alone or in admixture with a small amount of perfume or to molding into a certain form through melting followed by solidification upon cooling. However, these sublimable substances in the prior art have various disadvantages with respect to their properties and performance as a sublimable substance required for the above applications such as (1) sublimation rate, (2) character and strength of its odor, (3) perfume-carrying capability, (4) moldability and (5) volatility relative to the perfume.

SUMMARY OF THE INVENTION

This invention provides a sublimable fragrance composition comprising adamantane and a perfume.

BRIEF DESCRIPTION OF THE DRAWING

The FIGURE is a graph showing the sublimation rate of molded products of various sublimable substances.

DETAILED DESCRIPTION OF THE INVENTION

It has been found that adamantane is extremely excellent as a sublimable substance for use in a sublimable fragrance composition. Adamantane used in this invention is a saturated hydrocarbon having the formula $C_{10}H_{16}$ and the structure of four chair-form cyclohexane rings condensed in a cage-form. Adamantane crystals are sublimable having a melting point of 268°C and adamantane is very stable chemically. Adamantane naturally occurs in the high boiling components of petroleum and, synthetically, it can be easily produced with high yield starting from dicyclopentadiene obtained from petroleum and through the transition reaction of tetrahydrodicyclopentadiene using an aluminum halide as a catalyst (Journal of the American Chemical Society, Vol. 93, No. 11, p. 2798 – 2799 (1971) and Organic Syntheses, Vol. 42, p. 8 – 11 (1962), John Wiley and Sons, Inc.).

Adamantane and known sublimable substances were compared with regard to the above described characteristics (1) to (5) as follows:

1. Sublimation rate 3 g of each of adamantane, camphor, DCB and TCD was subjected to compression molding into tablets with 2 cm φ × 1 cm and then left in a room. The decrease in their weight with time (days) was measured. The results obtained are shown in the Figure and a rough ratio of their sublimation rates is shown in Table 1.

Table 1

| Sublimable Substance | Ratio of Sublimation Rate |
|---|---|
| Adamantane | 1 |
| Camphor | 2 |
| DCB | 6 |
| TCD | 10 |

Adamantane exhibits a sublimation rate corresponding to those of usual perfumes, while the sublimation rates of DCB and TCD can correspond only to specific perfumes and, thus, the perfume is left resulting in a staining of the surroundings.

2. Character and strength of its odor

| Sublimable Substance | Odor | Strength (threshold value* v/v ppm) |
|---|---|---|
| Adamantane | Very weak camphor-like odor | 5 |
| Camphor | — | 0.09 |
| DCB | Unpleasant stench | 0.87 |
| TCD | Weak camphor-like odor | 0.44 |

*Concentration at which odor is just discernable, represented by ppm by volume (the higher the threshold value, the lower the strength of the odor).

The strength of the odor of adamantane is less than one-tenth the strength of TCD which is considered nearly odorless at present among this kind of sublimable substance. Indeed, the odor of a large number of perfumes is changed by the odor of TCD, while only a small number of perfumes are changed by the odor of adamantane.

3. Perfume-carrying capability

Adamantane can carry at least 5% of the perfume, while other sublimable substances can carry at most 1 to 1.5% perfume and a larger amount of perfume restricts practical use resulting in a softening of the product and a seeping of oil contents. An adsorbing agent such as silica gel can be used to increase the amount of perfume which can be added and prevent the oil contents from seeping, but sublimation leaves a powdery material which disadvantageously diminishes the commercial value of the products. The use of adamantane can eliminate the above disadvantages without using such an adsorbing agent.

4. Moldability

Adamantane has a high melting point and is not suitable for molding through melting. However, this does not particularly provide a practical disadvantage as compared with other sublimable substances, since a powder of adamantane is easily molded under compression.

5. Volatility relative to perfume

When DCB or TCD which is compounded with 1% by weight perfume is molded and the change with time of the molded products is observed, it is often found that DCB or TCD gradually escapes and perfume seeps resulting in a softening of the molded products and, thus, deformation thereof. On the contrary, such disadvantages are not found with adamantane and camphor. Particularly, adamantane is consumed together with perfume with a maintenance of the initial condition throughout the sublimation. Thus, deformation due to a seeping of the perfume as with DCB and TCD is not observed and, therefore, adamantane is extremely suitable for a fragrance composition. Although camphor also exhibits this tendency, it is unsuitable for a fragrance composition since at most 1% by weight of a perfume can be carried and, in particular, the odor of camphor is so strong that it predominates over the odor of most perfumes. Adamantane is superior to camphor in that 5% by weight or more of perfume can be carried and adamantane is nearly odorless.

As described above, adamantane according to this invention has excellent properties and performance as a sublimable substance in a sublimable fragrance composition, and can provide a sublimable fragrance composition which is free from the disadvantages unavoidable in prior art compositions. Thus, adamantane is of great industrial use.

In practicing this invention, a sublimable fragrance composition can be obtained by adding up to about 5 to 7% by weight of the desired perfume oil uniformly to the powder of adamantane, sufficiently mixing and then subjecting the mixture to compression molding at normal temperature using a pressure of about 50 to 500 kg/cm$^2$. A suitable range can be from about 1 to 2% by weight up to about 5 to 7% by weight with about 5% by weight being generally used.

This invention will be further described by reference to the following examples. Unless otherwise indicated, all parts, percents, ratios and the like are by weight.

EXAMPLE 1

5 g of Bouquet Q-2685 (a preparation produced by Takasago Perfumery Co., Ltd.) was added to 95 g of powdered adamantane while stirring. After mixing the mixture well, the mixture was charged into a compression molding machine and molded at normal temperature (about 20° – 30°C).

EXAMPLE 2

6 g of Jasmin H-4352 (a preparation produced by Takasago Perfumery Co., Ltd.) was added to 94 g of powdered adamantane while stirring. After thoroughly mixing the mixture, the mixture was charged into a compression molding machine and then molded at normal temperature.

EXAMPLE 3

7 g of Cyclamen V-4052 (a preparation produced by Takasago Perfumery Co., Ltd.) was added to 93 g of powdered adamantane while stirring. After thoroughly mixing, the mixture was charged into a compression molding machine and then molded at normal temperature.

While the invention has been described in detail and with reference to specific embodiments thereof, it will be apparent to one skilled in the art that various changes and modifications can be made therein without departing from the spirit and scope thereof.

What is claimed is:

1. A sublimable fragrance composition comprising adamantane and a perfume.

2. The sublimable fragrance composition of claim 1, wherein said fragrance composition comprises a solid molding of adamantane and a perfume.

3. The sublimable fragrance composition of claim 1, wherein said perfume present in said sublimable fragrance composition in an amount of from about 1% by weight to about 7% by weight.

4. The sublimable fragrance composition of claim 1, wherein said perfume is a jasmin type perfume, a cyclamen type perfume or a bouquet type perfume.

* * * * *